Figure 1:
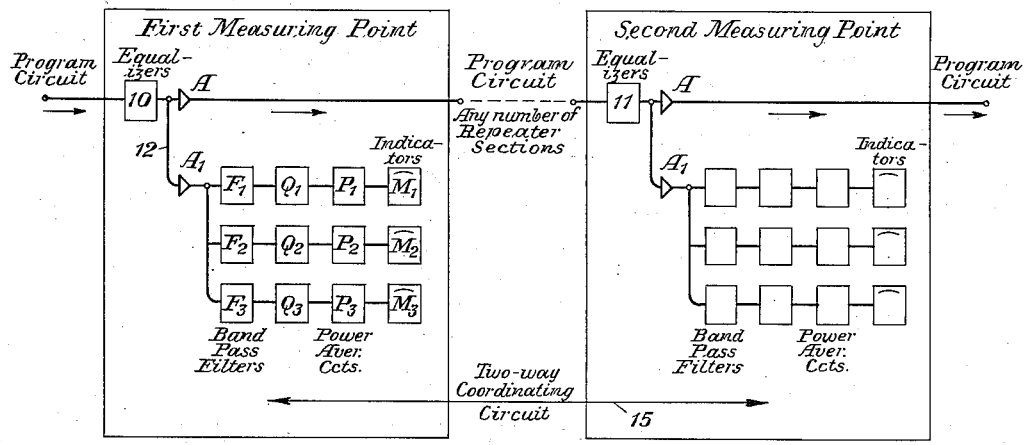

Dec. 4, 1934.  E. H. SCHREIBER  1,982,766

ELECTRICAL MEASURING DEVICE

Filed Sept. 26, 1933

INVENTOR
E. H. Schreiber
BY
ATTORNEY

Patented Dec. 4, 1934

1,982,766

UNITED STATES PATENT OFFICE 1,982,766

ELECTRICAL MEASURING DEVICE

Ernst Hofer Schreiber, Los Angeles, Calif., assignor to American Telephone and Telegraph Company, a corporation of New York Application September 26, 1933, Serial No. 691,074

2 Claims. (Cl. 136—4)

This invention relates to methods and means for checking telephone circuit equalization, and more particularly applies to circuits used for transmitting by wire, such as transcontinental lines, programs for broadcasting stations, or other purposes.

In the use of such lines it is important to check now and again on the transmission characteristics of the circuit or line to see that the transmission level or gain does not rise or fall beyond certain specified limits, and more particularly does not alter relatively within the frequency spectrum being used. Due to extreme changes in the equivalents of the facilities in use with changes in temperature and humidity along a transmission line, the frequency characteristics of the signal received at the remote end of a long circuit may show bad distortion. These changes are ordinarily compensated for in part by daily tests made on each of the units making up the complete circuit. However, with the deviations necessarily allowed in the line-up of each of the separate units, it is possible that the overall circuit may have considerable variation over the frequency range if the deviations are cumulative. Furthermore, in a circuit having an overall gross equivalent of several hundred decibels, the deviations may assume fairly large proportions with changing weather conditions. For these reasons it may be desirable to take measurements and make corresponding adjustments during intervals between parts of the program, using constant power sources at one point and suitable measuring instruments at another point. This, however, is difficult for the reason that the intervals between the different parts of a program are quite short, and the present tendency is to reduce these intervals.

The purpose of this invention is to devise a method and means by which the transmission equivalent of any section of a signaling network, or any number of sections lined up for through transmission, may be found without removing the section or sections from service.

Another purpose of the invention is to do this by means of an integrating device which will integrate over a period of suitable length to permit, upon ready observation at the two stations involved, an exchange of information on a useful basis.

Still another purpose of the invention is to devise such an integrating device which will be simple and rugged and yet of sufficient sensitivity.

The method of the invention consists in the application of band-pass filters to both ends of the circuit or line under consideration, followed or preceded by suitable amplifiers. A comparison of the respective power levels within a frequency band, utilizing the actual program or other signaling material, is then to be made by means of an integrating device for indicating the average power or the total energy over a definite period of time. Simultaneous observations are to be made at the two ends and the information exchanged.

The process is then repeated for other portions of the frequency range, whereupon the necessary circuit adjustments can be made to bring about transmission equalization throughout the signaling spectrum. In practice I find that it is not necessary to take measurements or observations over the whole signaling frequency spectrum or band but in the case, for example, of a circuit covering a 5000 cycle band it would, in general, be satisfactory to take measurements on the power in the bands 100 to 300, 800 to 1600 and 2500 to 4500 cycles.

Figure 2:
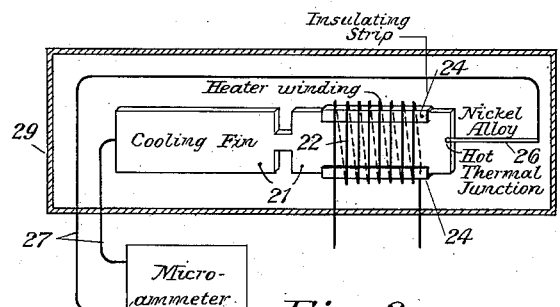
Figure 3:
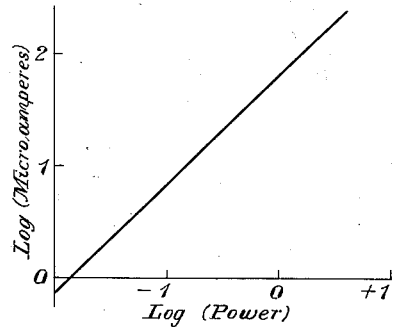
Figure 4:
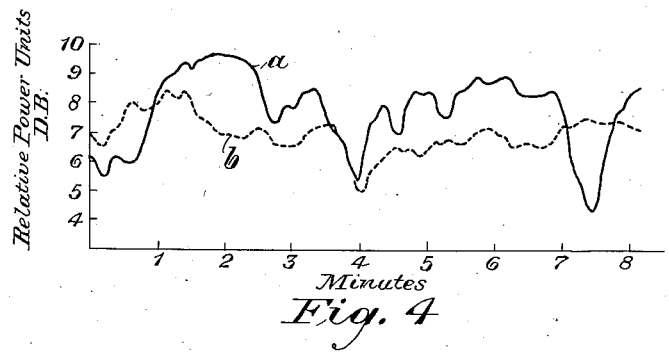

The invention will be better understood by reference to the following specification and the accompanying drawing in which Figure 1 is a schematic diagram of the program circuit with the devices necessary for this invention; Fig. 2 shows one form of integrating device constituting a part of my invention; Fig. 3 shows the characteristic of a device of the kind shown in Fig. 2; and Fig. 4 illustrates the type of record which may be obtained with the system of my invention on certain types of program.

Referring more specifically to Fig. 1, a program circuit, normally comprising a transmission line of a pair of wires, is shown with two stations at which suitable equalizers 10 and 11 are located, these preferably being adjustable and being supplemental to such others as may already be in the line. The two measuring points may be separated by as wide a space as desired. Bridged across the line at the point 12 is an amplifier $A_1$, to the output of which would be attached a plurality of band-pass filters connected preferably in parallel and adjusted to any convenient frequency bands. As an illustration, for example, these band-pass filters $F_1$, $F_2$ and $F_3$ might well be adjusted to the frequency bands mentioned above. The output of each of these band filters is then impressed upon suitable power averaging circuits or integrating devices $P_1$, $P_2$ and $P_3$, respectively, and the output of each of these goes to suitable indicating meters $M_1$, $M_2$ and $M_3$. These integrating devices with their meters may take on a variety of forms, one preferred form being described in greater detail below. In any event their character should be such that they indicate not the instantaneous power, which of course is subject to very sudden and numerous changes, but should be such that they are slow enough in action to permit a significant observation, which may then be transmitted to some other point.

The equipment at the second measuring point may be identical in every respect to that at the first measuring point, and the observers or operators at the respective stations are provided with some suitable independent communication channel, such as a telephone or telegraph line, shown at 15, and which may be spoken of as a coordinating circuit.

Referring now more specifically to Fig. 2, there is shown a device which I find suitable as an integrating device to be used in the circuit of Fig. 1. In this Fig. 2 there is shown a flat metal member 21 around one end of which is wound a wire, which I preferably use in the bare form, insulating this bare wire from the metallic plate 21 by suitable insulating strips 24. Connected to the metal plate 21 is some other metal 26, the two together forming a thermojunction, the circuit for this thermojunction comprising the metallic plate 21, the second metal 26 and suitable conductors 27 which lead to an indicating instrument such as a microammeter 28. The coil 22 is associated with one of the band filters either directly or through the medium of suitable amplifying or other power controlling devices. The current passing through this wire winding produces sufficient heat to appreciably raise the temperature of that portion of the metal strip 21 immediately under the winding. The shape of the metal plate 21 and the proximity of the connecting wires to the heating coil are such as to set up a temperature difference between the two junctions, thus giving rise to a current through the ammeter 28. A combination of metals which I have found appropriate for this purpose is that of brass for the metal plate and a nickel alloy for the portion 26, although it will be recognized that a very wide variety of choice of pairs of metals or alloys is available for the purpose. The portion of the plate 21 which I designate the cooling fin is sufficiently long so that the remote end maintains a substantially constant temperature and, in general, is not far different from that of the surrounding air. In order to prevent disturbances due to air currents I find it desirable to place this whole device in some protecting box 29. It is evident that in a device of this character there is a considerable lag between any change of current in the heating coil 22 and the resultant effect in the thermojunction circuit, and this lag is such as to very largely wipe out the numerous fluctuations and give a reading on the ammeter which is a kind of integrated effect taken over a reasonably long interval of time. The reading constitutes, as it were, a running average of the current in the heating coil in which the effects of the first and last portions are weighted less than the intermediate portion for the reason that the first portion involved in the integration has largely lost its effect and the last portion has not yet had full opportunity to make itself felt. The characteristic of one such device is illustrated in Fig. 3, in which a log-log plot of the power delivered to the heating coil or grid 22 and the reading of the microammeter are shown. It will be noted that the characteristic thus plotted is substantially a straight line, and an analysis of this curve will show that it is represented by the equation $$p = .014 i^{1.05}$$

where $p$ is the power in watts and $i$ is the current in microamperes.

The behavior of this integrating device in response to a definite program coming over a transmission line is indicated in Fig. 4 in which time in minutes is plotted along the horizontal coordinate and the relative power level in decibels is plotted in the vertical direction. The curve $a$ records the readings of the microammeter taken at five-second intervals for a program of opera music, and curve $b$ is similarly obtained for a program partly vocal and partly speech. It will be observed that the numerous and sharp fluctuations in power level characteristic of such signals have largely disappeared and that the indicator or needle of the microammeter goes through a slow motion. The position of the needle may be observed at any moment, whereupon the information on this may be sent to the other station for comparison with readings on an identical system. As shown in Fig. 1, observations are to be made substantially simultaneously on three frequency bands, and the readings of the three instruments at the one end should be related to each other in the same way as the readings of the instruments at the other end. If the readings are not so related then adjustment for equalization is made at the one station or the other, such as through the adjustable equalizers 10 or 11.

It will be recognized that as a rule the energy present in the higher frequency range will be considerably less than for the lower frequencies. For this reason it will usually be desirable to introduce fixed losses or gains, by attenuators or amplifiers, in one or another of the measuring circuits in order to make the readings of the meters of substantially the same magnitude. Such devices, either for introducing loss in some circuit or introducing gain in others, are indicated at $Q_1$, $Q_2$ and $Q_3$. At the same time these devices may be of a character to prevent any undesirable phenomena, such as reflections.

While I have described one particular form of integrating device, it is to be understood that many other forms may be used. Thus, instead of a thermojunction it would be feasible to use some vacuum tube integrating device which might indicate the total energy, starting at any particular time and proceeding for a definite period. Also, it might be any of the standard forms of volume indicators, although these change their indications so rapidly as to make it difficult to take a reading of significance and compare it with the reading at the same moment at the other station. The advantage of the particular device here described is that it does not require accurate timing at the measuring points, and merely requires a comparison of the readings of two slowly moving indicating meters at any desired time. The slowness of this movement, that is, the interval over which the running average is obtained, can obviously be made of any desired value by changes in the dimensions and proportions of the device of Fig. 2.

While the invention shows an amplifier bridged across the line at one of the measuring stations, this amplifier in turn feeding into band filters, it should be understood that such amplifiers are not necessary, but the band filters may be bridged directly across the line. This, in general, is not a desirable arrangement for the amplifiers serve a double purpose—first, they give increased power delivery to the band filters, and second, in their usual form they constitute a voltage-operated connection which does not draw an appreciable amount of power from the line or affect its characteristics in a significant way.

The invention has been described particularly with reference to its use for maintaining equalization of loss or gain throughout the signal frequency band between any two points on a transmission line. But it is evident that upon suitable calibration of the equipment it may be used for indicating at one point the actual energy level of an incoming signal or any portion of its frequency range. And it is evident, also, that it may be used for other purposes which will be apparent to those skilled in the art.

What is claimed is:

1. In an integrating device for signaling currents, a metal member, a heating coil for carrying the signal currents adjacent to the metal member and unsymmetrically located with respect to it, and a second different metal element connected to the first near the coil to form a thermojunction circuit.

2. An integrating device for telephonic signal currents comprising a flat metal member, a heating coil for carrying the signal current wound around and near one end of said member, and a wire of a second different metal connected to the first flat member near the coil to form a thermojunction circuit.

ERNST H. SCHREIBER.